(12) United States Patent
Lee et al.

(10) Patent No.: US 8,641,923 B2
(45) Date of Patent: Feb. 4, 2014

(54) LIQUID CRYSTAL COMPOSITION, LIQUID CRYSTAL DISPLAY USING THE LIQUID CRYSTAL COMPOSITION, AND METHOD OF MANUFACTURING THE LIQUID CRYSTAL DISPLAY

(75) Inventors: Ji-Hoon Lee, Asan-si (KR);
Sun-Kyoung Oh, Asan-si (KR);
Hee-Suck Cho, Asan-si (KR);
Kwang-Nyun Kim, Asan-si (KR)

(73) Assignee: NDIS Corporation (KR)

( * ) Notice: Subject to any disclaimer, the term of this patent is extended or adjusted under 35 U.S.C. 154(b) by 183 days.

(21) Appl. No.: 13/026,962

(22) Filed: Feb. 14, 2011

(65) Prior Publication Data

US 2011/0211143 A1 Sep. 1, 2011

(30) Foreign Application Priority Data

Feb. 26, 2010 (KR) ........................ 10-2010-0018091

(51) Int. Cl.
| | |
|---|---|
| *C09K 19/52* | (2006.01) |
| *C09K 19/06* | (2006.01) |
| *C09K 19/02* | (2006.01) |
| *C09K 19/00* | (2006.01) |
| *G02F 1/1333* | (2006.01) |

(52) U.S. Cl.
USPC ............... 252/299.01; 252/299.6; 428/1.1; 428/1.3; 349/86; 349/182

(58) Field of Classification Search
USPC ............... 252/299.01, 299.6; 428/1.1, 1.3; 349/86, 182
See application file for complete search history.

(56) References Cited

U.S. PATENT DOCUMENTS 7,361,389 B2 * 4/2008 Furue et al. ............... 428/1.1
2008/0316392 A1 12/2008 Arima et al.

FOREIGN PATENT DOCUMENTS

| JP | 6194636 A | 7/1994 | |
|---|---|---|---|
| JP | 09068701 A | 3/1997 | |
| JP | 09080399 A | 3/1997 | |
| JP | 09227453 A | 9/1997 | |
| JP | 09258185 A | 10/1997 | |
| JP | 09318931 A | 12/1997 | |
| JP | 2000267071 A | 9/2000 | |
| JP | 2001-100189 | * 4/2001 | ............ C09K 19/54 |
| JP | 2001133788 A | 5/2001 | |
| JP | 204515633 A | 5/2004 | |
| WO | WO-2009000521 A1 | 12/2008 | |

* cited by examiner

*Primary Examiner* — Geraldina Visconti
(74) *Attorney, Agent, or Firm* — Schwegman, Lundberg & Woessner, P.A.

(57) ABSTRACT

Disclosed is a liquid crystal mixture that includes an isotropic mixture of liquid crystal molecules and a photo-polymerizable monomer. In addition, disclosed are a liquid crystal display (LCD) including a first display panel and a second display panel facing each other, and a liquid crystal layer disposed between the first display panel and the second display panel and including a plurality of liquid crystal regions and a plurality of polymer structures positioned among the plurality of liquid crystal regions, and a method of manufacturing the liquid crystal display (LCD). The liquid crystal layer is formed of a liquid crystal mixture in which liquid crystal molecules and a photo-polymerizable monomer exist isotropically.

6 Claims, 5 Drawing Sheets

LIQUID CRYSTAL COMPOSITION, LIQUID CRYSTAL DISPLAY USING THE LIQUID CRYSTAL COMPOSITION, AND METHOD OF MANUFACTURING THE LIQUID CRYSTAL DISPLAY

CROSS-REFERENCE TO RELATED APPLICATION

This application claims priority to and the benefit of Korean Patent Application No. 10-2010-0018091 filed in the Korean Intellectual Property Office on Feb. 26, 2010, the entire contents of which are incorporated herein by reference.

BACKGROUND OF THE INVENTION (a) Field of the Invention

The present invention relates to a liquid crystal mixture, a liquid crystal display (LCD) using the liquid crystal mixture, and a method of manufacturing the same.

(b) Description of the Related Art

A liquid crystal display (LCD) is a flat panel display that is currently being widely used. The LCD includes a field generating electrode and a liquid crystal layer, and applies a voltage to the field generating electrode and thus produces an electric field in the liquid crystal layer. In this way, it determines the direction of liquid crystal molecules in the liquid crystal layer and adjusts transmittance of light passing through the liquid crystal layer.

Since the liquid crystal has fluidity, it should secure stability against an external impact. Accordingly, a method of forming a polymer network in the liquid crystal layer to form a plurality of liquid crystal domains has been suggested.

However, the liquid crystal domain regions and the polymer network regions are non-uniform in the panel, resulting in a non-uniform display characteristic over the panel.

SUMMARY OF THE INVENTION

One aspect of the present invention provides a liquid crystal mixture improving uniformity of display characteristics.

Another aspect of the present invention provides a liquid crystal display (LCD) using the liquid crystal mixture.

Yet another aspect of the present invention provides a method of manufacturing the liquid crystal display (LCD).

According to one embodiment of the present invention, a liquid crystal mixture is provided that includes the isotropic mixture of liquid crystal molecules and a photo-polymerizable monomer.

The photo-polymerizable monomer may include a compound represented by the following Chemical Formula 1.

$$R_1\text{-}A\text{-}R_2 \quad \text{[Chemical Formula 1]}$$

In Chemical Formula 1, A is a one-ring cyclic group selected from a C3 to C30 cycloalkyl group, a C6 to C30 bicycloalkyl group, and an C6 to C30 aryl group, and $R_1$ and $R_2$ are independently hydrogen, a substituted or unsubstituted (meth)acrylate group, a substituted or unsubstituted vinylether group, a substituted or unsubstituted epoxy group, a substituted or unsubstituted thiol group, or a combination thereof.

The A may include a cyclopentane, a cyclohexane, a cycloheptane, a cyclooctane, or a benzene ring.

The liquid crystal molecules and the photo-polymerizable monomer may be included in amounts of about 50 to 90 wt % and about 10 to 50 wt % based on the total amount of the liquid crystal mixture, respectively.

The liquid crystal mixture may further include a photoinitiator.

The liquid crystal molecules, the photo-polymerizable monomer, and the photoinitiator may be included in amounts of about 50 to 90 wt %, about 10 to 45 wt %, and about 0.5 to 5 wt % based on the total amount of the liquid crystal mixture, respectively.

According to another embodiment of the present invention, provided is a liquid crystal display (LCD) including a first display panel and a second display panel facing each other, and a liquid crystal layer disposed between the first and second display panels and including a plurality of liquid crystal regions and a plurality of polymer structures among the plurality of liquid crystal regions. The liquid crystal layer may be formed of the liquid crystal mixture of liquid crystal molecules and a photo-polymerizable monomer which exist isotropically.

The photo-polymerizable monomer may include a compound represented by the Chemical Formula 1.

According to still another embodiment of the present invention, provided is a method of manufacturing a liquid crystal display (LCD) which includes preparing a liquid crystal mixture including liquid crystal molecules and a photo-polymerizable monomer which exist isotropically, disposing the liquid crystal mixture between the first and second display panels, and radiating a light to the liquid crystal mixture to form a plurality of liquid crystal regions and a plurality of polymer structures.

The photo-polymerizable monomer may include a compound represented by the Chemical Formula 1.

The preparation of the liquid crystal mixture may further include a photoinitiator as well as the liquid crystal molecules and the photo-polymerizable monomer.

The liquid crystal molecules and the photo-polymerizable monomer may be included in amounts of about 50 to 90 wt % and about 10 to 50 wt % based on the total amount of the liquid crystal mixture, respectively.

Since the mixture of the liquid crystal molecules and the photo-polymerizable monomer exists isotropically regardless of temperature, the liquid crystal molecules and the photo-polymerizable monomer are not separated from each other and are uniformly dispersed. Accordingly, liquid crystal regions and polymer networks are uniformly dispersed over the liquid crystal layer after light radiation. Resultantly, a display may secure uniform characteristics. In addition, since the liquid crystal mixture maintains an isotropic state regardless of temperature, a liquid crystal display (LCD) can be manufactured at room temperature. Accordingly, this method may also be applied to a flexible display device.

DETAILED DESCRIPTION OF THE EMBODIMENTS

Figure 1:
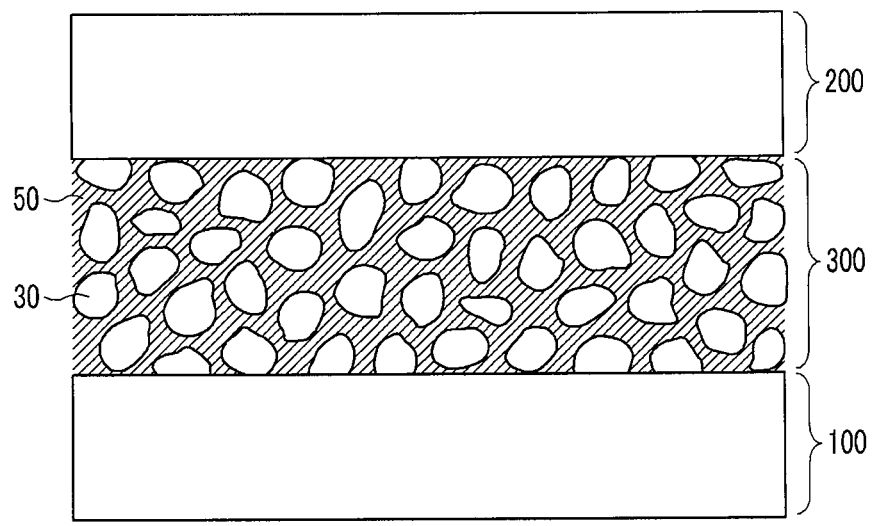
FIG. 1 provides a cross-sectional view illustrating a liquid crystal display (LCD) according to one embodiment of the present invention.

Exemplary embodiments of the present invention will hereinafter be described in detail referring to the following accompanied drawings, and can be easily performed by those who have common knowledge in the related art. However, these embodiments are only exemplary, and the present invention is not limited thereto.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the "substituted" refers to one substituted with a C1 to C30 alkyl group, a C2 to C30 alkynyl group, a C6 to C30 aryl group, a C7 to C30 arylalkyl group, a C1 to C4 oxyalkyl group, a C1 to C30 heteroalkyl group, a C3 to C30 heteroarylalkyl group, a C3 to C30 cycloalkyl group, a C3 to C15 cycloalkenyl group, a C6 to C30 cycloalkynyl group, a C2 to C30 heterocycloalkyl group, a halogen (F, Cl, Br, I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or salts thereof, a sulfonic acid group or salts thereof, phosphoric acid or salts thereof, and a combination thereof, instead of hydrogen of a compound.

First of all, referring to FIG. 1, a liquid crystal display (LCD) according to one embodiment of the present invention is illustrated.

FIG. 1 provides a cross-sectional view showing a liquid crystal display (LCD) according to one embodiment of the present invention.

The liquid crystal display (LCD) may include a liquid crystal layer 300 disposed between a lower panel 100 and an upper panel 200 facing each other.

The lower panel 100 and the upper panel 200 respectively include a substrate having a field generating electrode.

The substrate may include, for example, a glass substrate, a polymer layer, or a silicon wafer. When a substrate is made of a polymer, it may realize a flexible display device. Herein, the polymer may include, for example, one or more selected from polyacrylate, polyethylene etherphthalate, polyethylene naphthalate, polycarbonate, polyarylate, polyetherimide, polyethersulfone, polyimide, and the like.

The lower panel 100 may include a plurality of thin film transistors on the substrate. Herein, each thin film transistor may be a switching diode. However, the lower panel 100 is not limited thereto, and may include a passive type device including no switching diode like a thin film transistor or a segment type device.

The field generating electrode formed in the lower panel 100 is formed in each pixel and is electrically connected to the thin film transistor.

The field generating electrode in the upper panel 200 may be a common electrode and face the field generating electrode in the lower panel 100.

Then, an alignment layer is respectively disposed on the field generating electrode in the lower panel 100 and on the field generating electrode in the upper panel 200.

The liquid crystal layer 300 may include a plurality of liquid crystal regions (liquid crystal domains) 30 and a plurality of polymer structures 50.

The liquid crystal region 30 is formed by a plurality of liquid crystal molecules, which are uniformly dispersed all over the region.

The polymer structure 50 may be a polymer network and surround the liquid crystal region 30. However, the polymer structure 50 is not limited thereto, and may have various shapes such as a polymer column and the like.

The polymer structure 50 is formed when liquid crystal forms a plurality of liquid crystal regions 30, and may be fixed in a predetermined region. Accordingly, the liquid crystal is prevented from leaning by an external impact, having higher stability.

The liquid crystal layer 300 may be disposed as a liquid crystal mixture including liquid crystal molecules and a photo-polymerizable monomer. The liquid crystal mixture forms a polymer structure 50 when the photo-polymerizable monomer is photo-polymerized by radiating a light, and a plurality of liquid crystal regions 30 where the polymer structure 50 is not formed.

The liquid crystal mixture includes the liquid crystal molecules and the photo-polymerizable monomer which exist isotropically with each other. This isotropic state may be maintained regardless of temperature.

The liquid crystal molecules may be a generally-used nematic liquid crystal.

The photo-polymerizable monomer may be a compound represented by the following Chemical Formula 1.

  [Chemical Formula 1]

In Chemical Formula 1, A is a one-ring cyclic compound selected from a C3 to C30 cycloalkyl group, a C6 to C30 bicycloalkyl group, and an aryl group.

$R_1$ and $R_2$ are independently hydrogen, a substituted or unsubstituted (meth)acrylate group, a substituted or unsubstituted vinylether group, a substituted or unsubstituted epoxy group, a substituted or unsubstituted thiol group, or a combination thereof. $R_1$ and $R_2$ are not simultaneously hydrogen.

The A may include a cyclopentane, a cyclohexane, a cycloheptane, a cyclooctane, or a benzene ring.

The liquid crystal molecules and the photo-polymerizable monomer may be included in amounts of about 50 to 90 wt % and about 10 to 50 wt % based on the total amount of the liquid crystal mixture, respectively. When the liquid crystal molecules and the photo-polymerizable monomer are included within the range, they may bring about a further uniformly-distributed liquid crystal region and polymer structure, as well as maintain liquid crystal characteristics.

The liquid crystal mixture may further include a photoinitiator. The photoinitiator may have no particular limit if a compound can produce a radical, and for example, includes dimethoxy diphenyl ethanone.

When the photoinitiator is further included, the liquid crystal molecules, the photo-polymerizable monomer, and the photoinitiator may be included in amounts of about 50 to 90 wt %, about 10 to 45 wt %, and about 0.5 to 5 wt % based on the total amount of the liquid crystal mixture, respectively.

Since the photo-polymerizable monomer represented by the above Chemical Formula 1 has excellent miscibility with liquid crystal molecules, the photo-polymerizable monomer and the liquid crystal molecules are uniformly mixed all over the region. In addition, the photo-polymerizable monomer represented by the above Chemical Formula 1 disturbs the order of liquid crystal molecules. Thus, the liquid crystal molecules may be arranged in disorder regardless of a direction and isotropy.

Hereinafter, the isotropic state is illustrated referring to FIGS. 2 and 3 along with FIG. 1.

Figure 2:
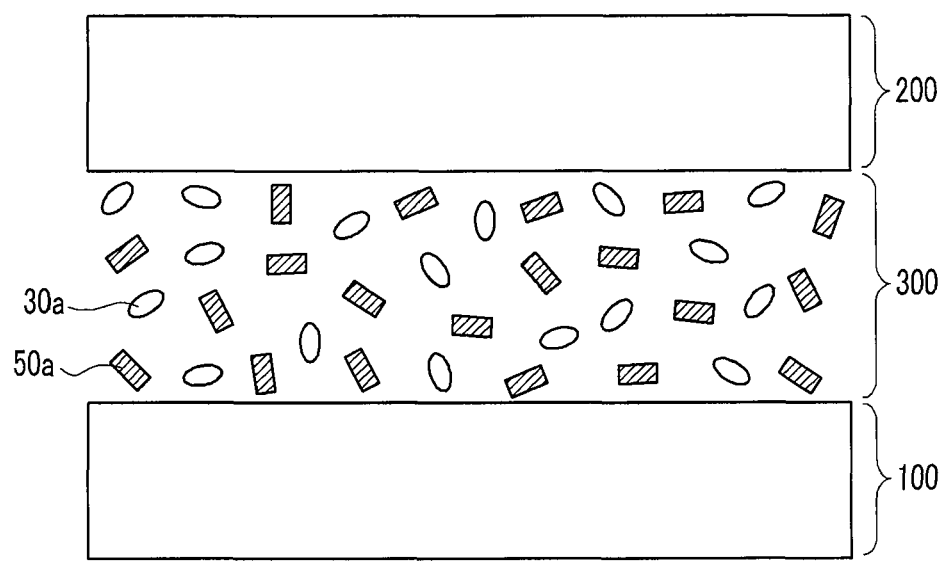
FIG. 2 is a cross-sectional view showing a liquid crystal layer disposed by using the liquid crystal mixture of liquid crystal molecules and a photo-polymerizable monomer which exist isotropically.
Figure 3:
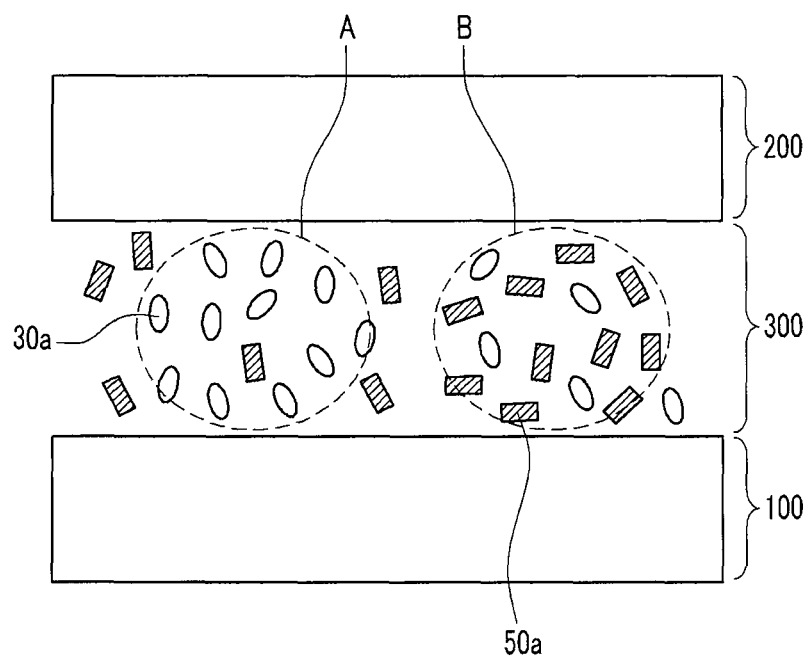
FIG. 3 shows a cross-sectional view illustrating a conventional liquid crystal mixture in which liquid crystal molecules and a monomer are non-uniformly distributed, and FIGS. 4A and 4B respectively show liquid crystal regions and polymer structures distributed in a liquid crystal layer in the liquid crystal displays (LCD) according to an example and a comparative example.

FIG. 2 provides a cross-sectional view showing a liquid crystal layer disposed by using a liquid crystal mixture in which liquid crystal molecules and a photo-polymerizable monomer exist isotropically. FIG. 3 provides a cross-sectional view showing a conventional liquid crystal mixture in which liquid crystal molecules and monomer are non-uniformly distributed.

Referring to FIG. 2, when a liquid crystal mixture according to one embodiment of the present invention is used, a photo-polymerizable monomer therein may disturb the order of liquid crystal molecules and cause the liquid crystal molecules to be arranged in disorder, increasing miscibility with the liquid crystal molecules. Accordingly, the liquid crystal molecules 30a and the photo -polymerizable monomer 50a may exist isotropically all over the region. After radiation, the liquid crystal region 30 formed where liquid crystal molecules 30a are collected and the polymer structure 50 formed when the photo-polymerizable monomer is polymerized may be uniformly distributed all over the display area, uniformly maintaining display characteristics.

On the contrary, since liquid crystal molecules 30a conventionally have bad miscibility with the monomer 50a, the liquid crystal molecules 30a are locally separated from the monomer 50a. The liquid crystal molecules 30a and the monomer 50a have a different spreading speed and thus are separated from each other when the mixture is injected or coated. As shown in FIG. 3, the liquid crystal molecules 30a are distributed in a predetermined region A, while the monomer 50a is distributed in a predetermined region B. Thus, the liquid crystal molecules 30a and the monomer 50a are non-uniformly distributed. When the non-uniformly distributed liquid crystal molecules 30a and monomer 50a are radiated by a light, liquid crystal regions 30 and polymer structures 50 are non-uniformly distributed depending on a region. Accordingly, a display may have non-uniform luminance all over a panel.

However, according to the embodiment of the present invention, liquid crystal molecules may have higher miscibility with the photo-polymerizable monomer, bringing about an isotropic mixture and thus improving display characteristics.

Referring to FIG. 1, a method of manufacturing a liquid crystal display (LCD) is illustrated.

First of all, liquid crystal molecules and the photo-polymerizable monomer are mixed together in an isotropic state to prepare a liquid crystal mixture. The liquid crystal mixture may further include a photoinitiator.

The liquid crystal molecules, the photo-polymerizable monomer, and the photoinitiator are the same as aforementioned.

Next, the first display panel 100 and the second display panel 200 are respectively prepared.

The first display panel 100 is fabricated by laminating a thin film transistor, a field generating electrode, an alignment layer, and the like on a substrate. The second display panel 200 is fabricated by laminating a common electrode, an alignment layer, and the like on a substrate.

Next, the isotropic liquid crystal mixture is disposed between the first display panel 100 and the second display panel 200. After the liquid crystal mixture is dropped on the first display panel 100 or the second display panel 200, the first and second display panels 100 and 200 are assembled together. Otherwise, after the first and second display panels 100 and 200 are assembled together, the liquid crystal mixture may be injected therebetween.

Then, at least one of the first and second display panels 100 and 200 is radiated by a light. The photo-polymerizable monomer is polymerized by radiating a light to form a polymer structure 50. The polymer structure 50 includes a plurality of liquid crystal regions 30.

Hereinafter, the present invention will be illustrated in detail referring to examples. However, the following examples are used to illustrate the purpose of the present invention but do not limit the scope thereof.

EXAMPLE

Preparation of Liquid Crystal Mixture

A liquid crystal mixture is prepared by mixing of 70 wt % of liquid crystal MLC7026 (Merck & Co., Inc.) and 30 wt % of a photo-polymerizable monomer. Herein, the photo-polymerizable monomer is prepared by mixing 80 wt % of isobornylmethacrylate (Sigma-Aldrich Co.), 18 wt % of hexanediol diacrylate (Sigma-Aldrich Co.), and 2 wt % of benzophenone (Sigma-Aldrich Co.).

Fabrication of Liquid Crystal Display (LCD)

An ITO electrode was disposed on one surface of a polymer substrate made of polycarbonate, and then a vertical alignment layer SE1211 (Nissan Chemical Industries, Ltd.) was disposed thereon and cured at 180° C. for 1 hour.

Next, the liquid crystal mixture was mixed with a ceramic bead spacer with a diameter of 4 μm. The resulting mixture was coated on the vertical alignment layer. The resulting product was united with another polymer substrate including an ITO electrode thereon.

Then, an ultraviolet (UV) ray with a wavelength of 365 nm was radiated on one side of the polymer substrate, polymerizing the photo-polymerizable monomer.

Comparative Example

A liquid crystal display (LCD) was fabricated by preparing a liquid crystal mixture according to the same method as the example, except for using NOA65 (Norland Inc.), which is a commercially available photo-polymerizable monomer.

Evaluation

Figure 4A:
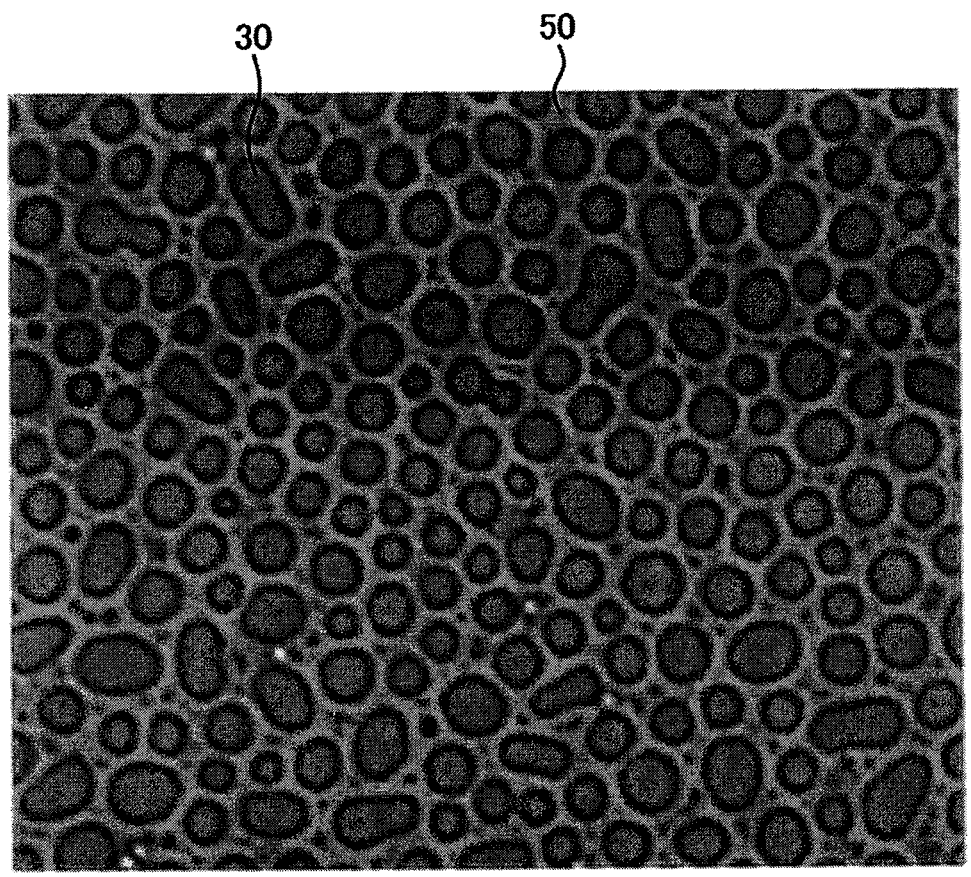
Figure 4B:
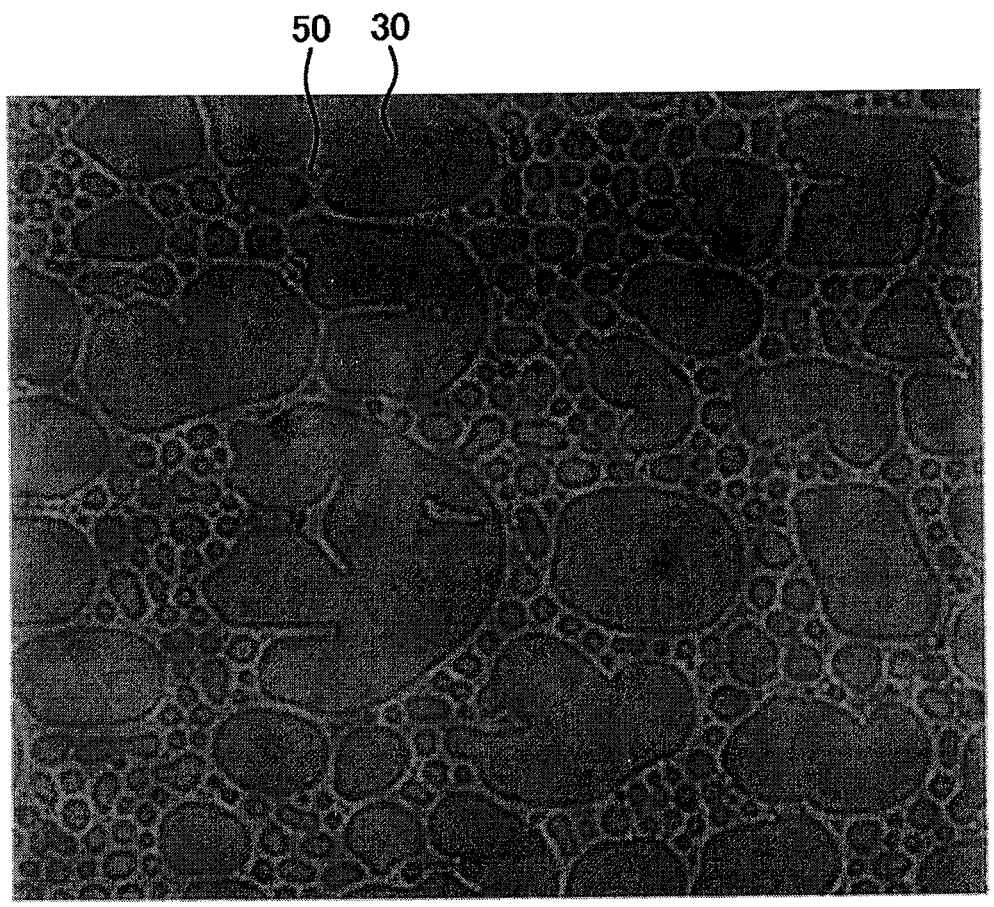

The liquid crystal displays (LCD) according to the example and comparative example are illustrated referring to FIGS. 4A and 4B.

FIGS. 4A and 4B are photographs respectively showing a liquid crystal region and a polymer structure uniformly distributed in a liquid crystal layer in the liquid crystal displays (LCD) according to the example and comparative example.

Referring to FIG. 4A, the liquid crystal display (LCD) according to the example included a liquid crystal region 30 and a polymer structure 50 uniformly distributed all over the liquid crystal layer. When a liquid crystal region 30 is uniformly distributed, it may bring about excellent display characteristics such as luminance.

On the contrary, referring to FIG. 4B, the liquid crystal display (LCD) according to the comparative example included liquid crystal regions 30 with various sizes all over the liquid crystal layer. Accordingly, the liquid crystal regions 30 were not uniformly distributed. When the liquid crystal regions 30 are not uniformly distributed, it may bring about non-uniform display characteristics such as luminance and the like, deteriorating display characteristics.

According to the embodiment of the present invention, since the mixture of the liquid crystal molecules and the photo-polymerizable monomer is isotropic, the liquid crystal molecules and the photo-polymerizable monomer are not separated over the liquid crystal layer but are uniformly distributed, securing uniformity of display characteristics. In addition, since the liquid crystal mixture is maintained to be isotropic regardless of temperature, it may be used to fabricate a liquid crystal display (LCD) at room temperature and may be applied to a flexible display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal mixture comprising an isotropic mixture of nematic liquid crystal molecules, a photo-polymerizable monomer, and a photoinitiator;

wherein the photo-polymerizable monomer comprises a compound represented by the following Chemical Formula 1:

$R_1$-A-$R_2$         [Chemical Formula 1]

wherein, in Chemical Formula 1, A is a one-ring cyclic compound selected from a C3 to C30 cycloalkyl group, a C6 to C30 bicycloalkyl group, and an C6 to C30 aryl group, and $R_1$ and $R_2$ are independently hydrogen, a substituted or unsubstituted (meth)acrylate group, a substituted or unsubstituted vinylether group, a substituted or unsubstituted epoxy group, a substituted or unsubstituted thiol group, or a combination thereof.

2. The liquid crystal mixture of claim 1, wherein the A comprises a cyclopentane, a cyclohexane, a cycloheptane, a cyclooctane, or a benzene ring.

3. The liquid crystal mixture of claim 1, wherein the liquid crystal molecules, the photo-polymerizable monomer and the photoinitiator are included in amounts of about 50 to 90 wt %, about 10 to 45 wt %, and about 0.5 to 5 wt % based on the total amount of the liquid crystal mixture, respectively.

4. A liquid crystal display (LCD) comprising
a first display panel and a second display panel facing each other, and
a liquid crystal layer disposed between the first display panel and the second display panel and comprising a plurality of liquid crystal regions and a plurality of polymer structures disposed among the liquid crystal regions,
wherein the liquid crystal layer is formed by photopolymerization of an isotropic mixture of nematic liquid crystal molecules, a photo-polymerizable monomer and a photoinitiator; and
wherein the photo-polymerizable monomer comprises a compound represented by the following Chemical Formula 1:

$R_1$-A-$R_2$         [Chemical Formula 1]

wherein, in Chemical Formula 1, A is a one-ring cyclic compound selected from a C3 to C30 cycloalkyl group, a C6 to C30 bicycloalkyl group, and an C6 to C30 aryl group, and $R_1$ and $R_2$ are independently hydrogen, a substituted or unsubstituted (meth)acrylate group, a substituted or unsubstituted vinylether group, a substituted or unsubstituted epoxy group, a substituted or unsubstituted thiol group, or a combination thereof.

5. A method of manufacturing a liquid crystal display (LCD), comprising:
preparing a liquid crystal mixture by mixing nematic liquid crystal molecules, a photoinitiator, and a photo-polymerizable monomer which exist isotropically;
disposing the isotropic liquid crystal mixture between the first and second display panels; and
radiating a light to the liquid crystal mixture to form a plurality of liquid crystal regions and a plurality of polymer structures;
wherein the photo-polymerizable monomer comprises a compound represented by the following Chemical Formula 1:

$R_1$-A-$R_2$         [Chemical Formula 1]

wherein, in Chemical Formula 1, A is a one-ring cyclic compound selected from a C3 to C30 cycloalkyl group, a C6 to C30 bicycloalkyl group, and an C6 to C30 aryl group, and $R_1$ and $R_2$ are independently hydrogen, a substituted or unsubstituted (meth)acrylate group, a substituted or unsubstituted vinylether group, a substituted or unsubstituted epoxy group, a substituted or unsubstituted thiol group, or a combination thereof.

6. The method of claim 5, wherein the nematic liquid crystal molecules and the photo-polymerizable monomer are included in amounts of about 50 to 90 wt %, about 10 to 45 wt % and about 0.5 to 5 wt % based on the total amount of the liquid crystal mixture, respectively.

* * * * *